United States Patent
Waterhouse et al.

(10) Patent No.: US 10,586,466 B2
(45) Date of Patent: Mar. 10, 2020

(54) PROCESS FOR DISPLAYING AN ACTION VIGNETTE WHILE TEXT OF A PASSAGE ASSOCIATED WITH THE ACTION VIGNETTE IS CORRECTLY READ ALOUD

(71) Applicants: Jonathan Andrew Waterhouse, Anchorage, AK (US); Mary Allen Marshall, Anchorage, AK (US)

(72) Inventors: Jonathan Andrew Waterhouse, Anchorage, AK (US); Mary Allen Marshall, Anchorage, AK (US)

( * ) Notice: Subject to any disclaimer, the term of this patent is extended or adjusted under 35 U.S.C. 154(b) by 1042 days.

(21) Appl. No.: 14/245,714

(22) Filed: Apr. 4, 2014

(65) Prior Publication Data

US 2014/0302465 A1 Oct. 9, 2014

Related U.S. Application Data

(60) Provisional application No. 61/808,363, filed on Apr. 4, 2013.

(51) Int. Cl.
*G09B 5/02* (2006.01)

(52) U.S. Cl.
CPC .................................... *G09B 5/02* (2013.01)

(58) Field of Classification Search
CPC ....... G09B 5/02; G09B 17/003; G09B 17/006
USPC ......................................... 434/167; 704/257
See application file for complete search history.

(56) References Cited

U.S. PATENT DOCUMENTS

| 5,938,447 | A | 8/1999 | Kirksey |
| 6,324,507 | B1 * | 11/2001 | Lewis ............... G10L 15/063 |
| | | | 379/88.01 |
| 7,153,139 | B2 | 12/2006 | Wen et al. |
| 2006/0041428 | A1 | 2/2006 | Fritsch et al. |
| 2009/0070112 | A1 | 3/2009 | Li et al. |

OTHER PUBLICATIONS

International Search Report dated Aug. 28, 2014 from corresponding international application PCT/US2014/033105 USPTO PCT Division/ Authorized Officer Lee W. Young.

* cited by examiner

*Primary Examiner* — Jerry-Daryl Fletcher
(74) *Attorney, Agent, or Firm* — Plager Schack LLP; Mark H. Plager; Michael J. O'Brien

(57) ABSTRACT

A method for teaching a person, such as a child, to read aloud is disclosed. The method is implemented as a voice activated, visual software application that provides a visual display of a story as the person reads the words of the story. The method provides pronunciation assistance to the person, which in the software includes a simulated "teacher" that helps the person with assistance in reading the story. The method progresses through a sequence of story passages which together represent the entire story. The method progresses to each story passage upon successful completion of the current story passage by the person reading the story, such that the method will not allow the visual story to progress for the reader if a word is not read correctly out loud.

10 Claims, 3 Drawing Sheets

PROCESS FOR DISPLAYING AN ACTION VIGNETTE WHILE TEXT OF A PASSAGE ASSOCIATED WITH THE ACTION VIGNETTE IS CORRECTLY READ ALOUD

CLAIM OF BENEFIT TO PRIOR APPLICATION

This application claims benefit to U.S. Provisional Patent Application 61/808,363, entitled "READING INCENTIVE/REWARD: E-READER TECHNOLOGY WITH VOICE-ACTIVATION TECHNOLOGY CAUSING LIVE ACTION/ANIMATION TO OCCUR ONSCREEN WHEN CORRESPONDING ONSCREEN TEXT IS CORRECTLY READ ALOUD," filed Apr. 4, 2013. The U.S. Provisional Patent Application 61/808,363 is incorporated herein by reference.

BACKGROUND

Many children struggle with an inability to read well, or at all, due to uninspiring teaching methods. Combined with a lack of involvement by their parents and embarrassment at their own low skill levels for reading aloud, low success rates and failure are common. Children often lose confidence in their own ability to read and are uncomfortable trying to improve their reading capacity. For many children, the lack of comfort can be an insurmountable barrier to improving confidence in the child's own ability to read. In order to feel more comfortable when trying to learn how to read material that is beyond a child's reading capacity, the child needs to be involved in the reading material. Thus, techniques for engaging children in the subject matter of written content are needed if there is any hope to improve the child's reading. Only then will the child begin to develop self-confidence in order to tackle more challenging reading material.

One technique that is used is to offer a reward for reading. For example, classrooms employ various achievement rewards to chart the progress of children in reading. Once the child earns a reward (e.g., a star for reading material related to a lesson), the child can affix the reward to his own chart. However, these types of rewards typically do not motivate children based on the subject matter being read, but motivate based on trying to outperform other children. This is counter-productive for a struggling child who either feels uncomfortable reading aloud, or lacks confidence to do so. When some children are greatly rewarded for excelling at reading, and other children are adequately rewarded (e.g., enough reward for regular motivation), a struggling child who fails to earn many (or any) rewards of his/her own will suffer severe self-confidence issues.

Other techniques focus on negative reinforcement. For example, a progress report may indicate that a struggling child has problems with reading and needs to improve in order to be at the expected level of reading for the child's age. The struggling child in this case may feel inadequate or shameful when the child's parents are given the report from the teacher. A child in this situation can easily become turned off by reading (while still being interested in other subjects) or may disengage from the educational process entirely. However, during the course of reading when a struggling child is rewarded for reading correctly, the child's self-confidence will naturally improve irrespective of the reading abilities of other children. This would allow the child to take further steps to improve on his/her reading aloud skills.

Therefore, what is needed is a way to engage children in the subject matter of written material and offer achievable rewards for progress in learning to read.

BRIEF DESCRIPTION

Some embodiments of the invention include a novel method for teaching reading through visualization-based rewards. In some embodiments, an action vignette is displayed when words from a passage of text are correctly pronounced. The vignette is comprised of a set of images related to the passage of text. In some embodiments, the vignette is one of an animation and a live action clip in which the images are sequentially displayed as the words are correctly pronounced.

In some embodiments, the passage of text is a part of a story to be read by a person learning to read. In some embodiments, the method includes displaying the words of the passage of text for the person learning to read, receiving an audible input from the person learning to read, determining whether the audible input includes correctly pronounced words, and displaying the set of images related to the passage of text when the audible input from the person includes the correctly pronounced words.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
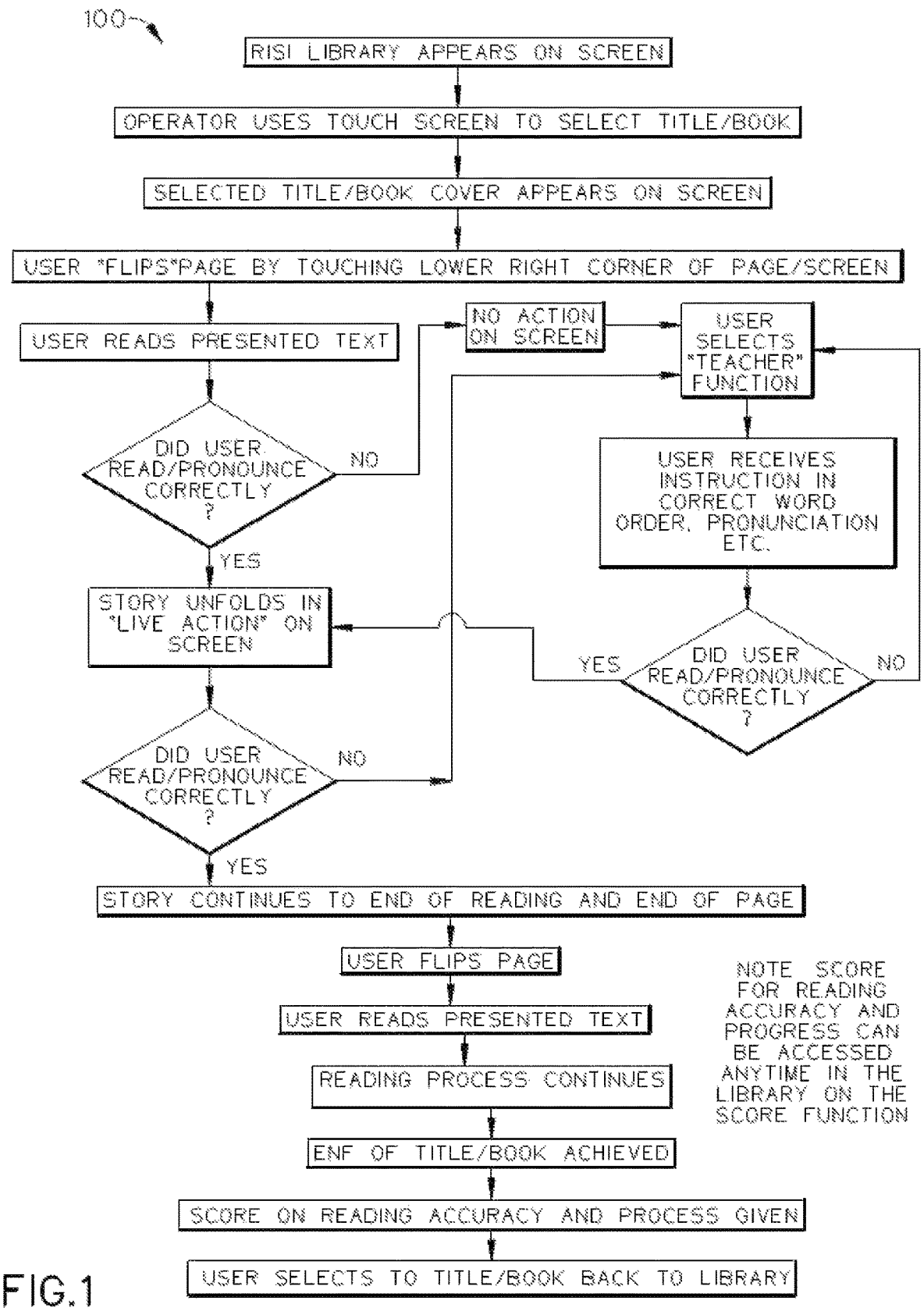
FIG. 1 conceptually illustrates process for rewarding and motivating a reader of a story in some embodiments.

In the following detailed description of the invention, numerous details, examples, and embodiments of the invention are described. However, it will be clear and apparent to one skilled in the art that the invention is not limited to the embodiments set forth and that the invention can be adapted for use in several different circumstances.

Some embodiments of the invention include a novel method for teaching reading through visualization-based rewards. In some embodiments, an action vignette is displayed when words from a passage of text are correctly pronounced. The vignette is comprised of a set of images related to the passage of text. In some embodiments, the vignette is one of an animation and a live action clip in which the images are sequentially displayed as the words are correctly pronounced.

In some embodiments, the passage of text is a part of a story to be read by a person learning to read. In some embodiments, the method includes displaying the words of the passage of text for the person learning to read, receiving an audible input from the person learning to read, determining whether the audible input includes correctly pronounced words, and displaying the set of images related to the passage of text when the audible input from the person includes the correctly pronounced words.

In some embodiments, the method includes providing an indicator when the audible input from the person learning to read does not include the correctly pronounced words. The indicator is one or more of an audible indicator, a visual indicator, and a sensory indicator. In these embodiments, the method waits for a correct pronunciation before displaying the set of images associated with the set of words. In some embodiments, the method includes providing a simulated teacher when the person learning to read needs assistance pronouncing the set of words.

In some embodiments, the method is implemented on a device that has a visual software application which provides a visual display of a story as a child reads the words of the story. In some embodiments, the software displays the words of the story in a sequence of word subsets. For example, the software may display the words of the story in storybook fashion, with a new subset of words for each page of the storybook. In some embodiments, the software visually unfolds the story according to the speed at which the child reads the words of the story. In these embodiments, the software displays a set of images for each page of the story, where the images for any page are associated with the words of the page. Either or both of the words and the images for a given page are animated. In some embodiments, the software will not allow the visual story to progress for the reader if a word is not read correctly out loud. The software of some embodiments further includes a simulated "teacher" that allows a child to seek assistance with reading the story.

The device can be any of several different electronic E-reader devices. Examples of E-reader devices include the Kindle Paperwhite or the Kindle Fire HD by Amazon and the Nook Simple Touch or Nook HD by Barnes & Noble. Alternatively, the device can be any kind of mobile device having a processor on which an app can execute to provide a visual display of an unfolding story as a child reads the words of the story. One example of a software application or app that provides a visual display of a story to teach a child to read aloud is "Read It, See It" (i.e., RISI). RISI is a voice activated, digital audio/visual reading software program which allows a reader (e.g., a child learning to read) to cause the words of a story to unfold in a manner that is similar to how a movie is displayed onscreen. The voice activation of RISI allows the child to try to read the displayed words correctly. When the words are read correctly out loud, the child is rewarded by seeing the action/animation unfold onscreen as the correlating text is correctly read out loud. For example, the text onscreen may read, "Ellie ran into her room and jumped on her bed. Her dog, Lucky, followed behind her and jumped up there, too!" and onscreen Ellie will be displayed running into her room and also jumping on her bed. The action occurs as each word/sentence is correctly read aloud. Stopping anywhere prior to the completion of a sentence will stop the action and it will not continue until the text is read correctly aloud. In this manner, a child quickly learns that RISI (and other such software applications for teaching reading or other educational subject matter) works at their own speed in a no-pressure environment. Furthermore, because RISI displays images of the unfolding story, the child becomes motivated to read the words correctly out loud. Thus, the child is figuratively transformed into the story teller and controller of the unfolding story. Because the child, as the reader of the words, is able to control the story they see onscreen by correctly pronouncing and enunciating the words, they feel empowered and engaged to read from the same screen. An audio 'teacher' is available to help with words, sentences, pronunciation, and definitions of words.

Although the reader is able to control the story they see onscreen by correctly pronouncing and enunciating the words they'll read from the same screen, sometimes the child encounters a troubling word that he/she cannot correctly pronounce. Just as any writer is capable of having writers block, a child also may have word block even for words that are below the child's capacity for reading. Whatever the cause or solution is for the mental block, the central focus of RISI is to improve reading aloud by improving child engagement and confidence. Also, there is frequent uncertainty for many children with regard to the pronunciation of a word, and often the meaning of words read are not explained thoroughly. However, such mental blocks and uncertainty can be overcome in RISI by the simulated audio "teacher" that is available to help with words, sentences, pronunciation, and definitions of words. In some cases, children may be tempted to use the simulated teacher to get through the entire set of words in a story. While limiting the ability of the child to be challenged, even this requires the child to repeat the word aloud after the teacher pronounces it. Thus, the RISI system works in challenge mode as well as in the unintended ask-and-repeat mode.

FIG. 1 conceptually illustrates process 100 for rewarding and motivating a reader of a story in some embodiments. As shown in this figure, a reader is able to use a computing device to select a title of a book to read from a library (e.g., an online library accessed over the Internet or a local library including one or more e-books stored locally on the computing device or on a storage device that is locally connected to the computing device). The reader is able to read the book when text is presented on the display screen of the computing device. Different text appears on different pages of the e-book, similar to the pages of a physical bound book where the reader can turn pages on the computing device in a manner permitted by the computing device. For instance, the reader may use a mouse to click a 'next page' button, or in some cases, may simply touch the lower right corner of the screen if the computing device includes a touch-sensitive screen. When the reader "reads" the text displayed on the screen, the application determines if the text was pronounced correctly. When the pronunciation is correct, the story unfolds on the screen in the form of an animation or live action related to the particular text that was read. If pronunciation is incorrect, the reader can access the assistance available on the application (i.e., the "teacher" function) to receive instruction on correct pronunciation or word order, etc. This continues until the reader finishes or quits the story. Scores and progress reports may be generated by the application which report on the reader's accuracy in pronouncing the words of the story, and other such learning metrics.

One advantage of RISI and other voice-activated story visualizers is the ease with which a user can participate.

With only the smallest amount of general knowledge about computing devices (e.g., how to turn on the device and launch applications), a child can get reading instruction in the absence of a parent or teacher. Simply open the application or program and follow the instructional icons to start and proceed through the story. In addition, multiple voice-activated visualizers can be used easily in a classroom setting by creating a 'RISI Network' for individual tablets, e-readers, or general computing devices or, alternatively, on large monitors or screens. It can also be used by parents who do not read to their children. However, RISI will not allow the visual story to progress if a word is not read correctly out loud.

While RISI and other voice-activated story visualizers excel at motivating and engaging children in a story, and therefore, put children in the perfect position to learn to read aloud, it can be used in any of several different modes. For instance, RISI can be used by someone who wants to learn another language. Also, RISI can be used for very early readers with voice-activated story visualizers and sentence by sentence action as in the old Dick and Jane books. Repetitive, simple sentences such as, "See Jane run!" allows RISI to exceed the basic interaction. In this case for very young readers, each single sentence will prompt the action on the screen to occur.

Once the app/program is opened on a tablet, smartphone, e-reader or any computer device, a Menu appears from which the reader selects a book or story by voice or by manually selecting an icon. The reader then reads aloud the scrolling story, which can be viewed one sentence at a time or if 'zoomed out'—read by the paragraph. The words read aloud prompt the scene corresponding with the spoken word to appear in another area of the screen. If a word is mispronounced or omitted, the word blinks and the visual story is halted until the word is spoken or re-spoken correctly. Any word can be highlighted to prompt an audio definition to be described by the 'teacher'. If a reader is uncertain of an entire sentence or paragraph, the teacher icon my be enlisted to read the section in question for the student to hear. The voice of the teacher will not facilitate the visual story's progression as only the reader will cause this to happen.

Figure 2:
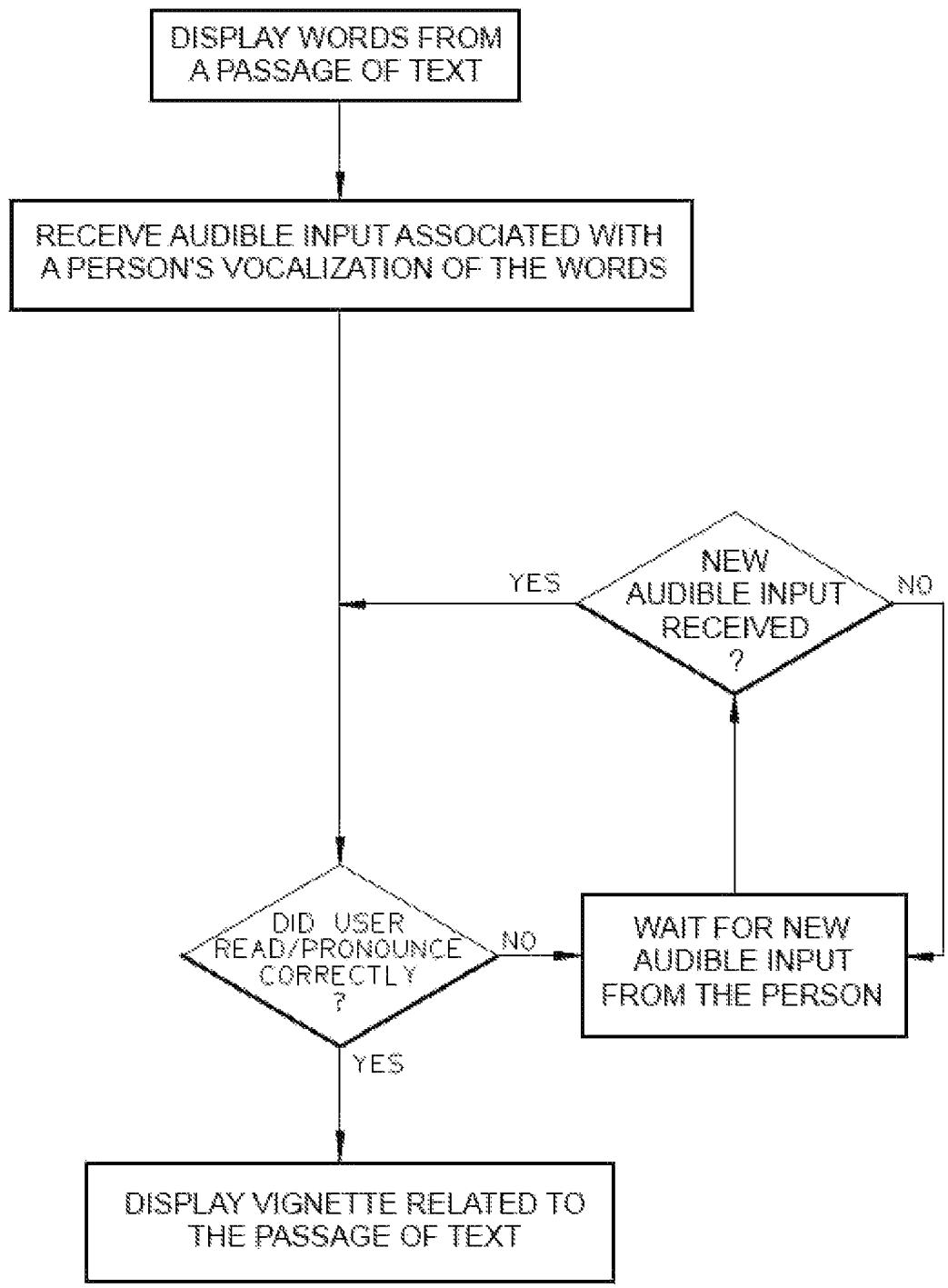
FIG. 2 conceptually illustrates a process for displaying a live action or animated vignette of a passage in a story in response to a reader's correct pronunciation of the words in the story passage in some embodiments.

FIG. 2 conceptually illustrates a process 200 for displaying a live action or animated vignette of a passage in a story in response to a reader's correct pronunciation of the words in the story passage in some embodiments. The process 200 is performed by the software program or application that is displaying the story and providing the voice activation technology. From the perspective of the software, the process 200 starts by displaying words from a passage of text in a story. In some embodiments, a reader of the story may have selected a title from a library or may have loaded a story from an online database of stories. When displaying the words of the passage of text, the process 200 either start at the beginning of the story or, in some cases, at a book-marked position in the story. For example, the reader may have started reading the story in the morning, saved the story page and shut down the software application, and only later in the evening returned to the computing device to start the story at the saved page of the story.

After showing the words from the textual passage, the process 200 receives an audible input from the reader. In some embodiments, the read-it see-it software waits for the reader to try and pronounce the words that are displayed, and when the reader vocalizes some audible sounds, the software's voice activation technology captures the vocalization as an audible input and processes the audible input for correct pronunciation of the expected words. In some embodiments, the software compares sounds waves of the audible input to a set of sound waves that are considered to be correctly pronounced words. In some embodiments, ranges of wave amplitudes and periods are allowed so that the reader can pronounce the words correctly even if the words are read very slowly, very fast, or at different speeds during the reading of the passage of text.

When the software determines that the reader correctly vocalized the words according to the correct pronunciation and order, the process 200 then displays a vignette related to the passage of text. For example, the software may display an animation of the words just read, or a live action sequence related to the passage.

On the other hand, if the words were not pronounced correctly or read out of order, the process 200 waits for a new audible input from the reader. In some cases, the reader may activate other features of the software before attempting to pronounce the words again. In any event, the software maintains a listener sub-routine within the voice activation technology so that when the reader decides to try and pronounce the words again, the software can capture the new audible input. After a new audible input is captured, the software returns to the operations discussed above for determining whether the words were correctly pronounced and in the correct order.

In some embodiments, an 'auto' option might be created so that the 'teacher' simply reads the whole story to the reader without interaction. A visual scene might unfold prior to any words being read aloud, prompting a reader to read the words they see. Another feature is for sound effects (e.g., "Susie's new cat watched Susie play the piano.") and we hear the piano playing as Susie touches the keys.

Another advantage is that RISI includes page transitions. Whatever 'action' has unfolded on the 'page' once the words have been read will also be part of the transition to the next page. For example, the sentence "Susie swept up the magic powder and put it back in the jar." After this sentence is read correctly aloud by the reader, we see Susie sweep the words of that 'page' onto the next page where they magically form the next sentence or paragraph. Perhaps only the words appear on the page and fall into a new sentence or paragraph but the character or deliverer of the text may also continue in the scene there, depending on the story.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
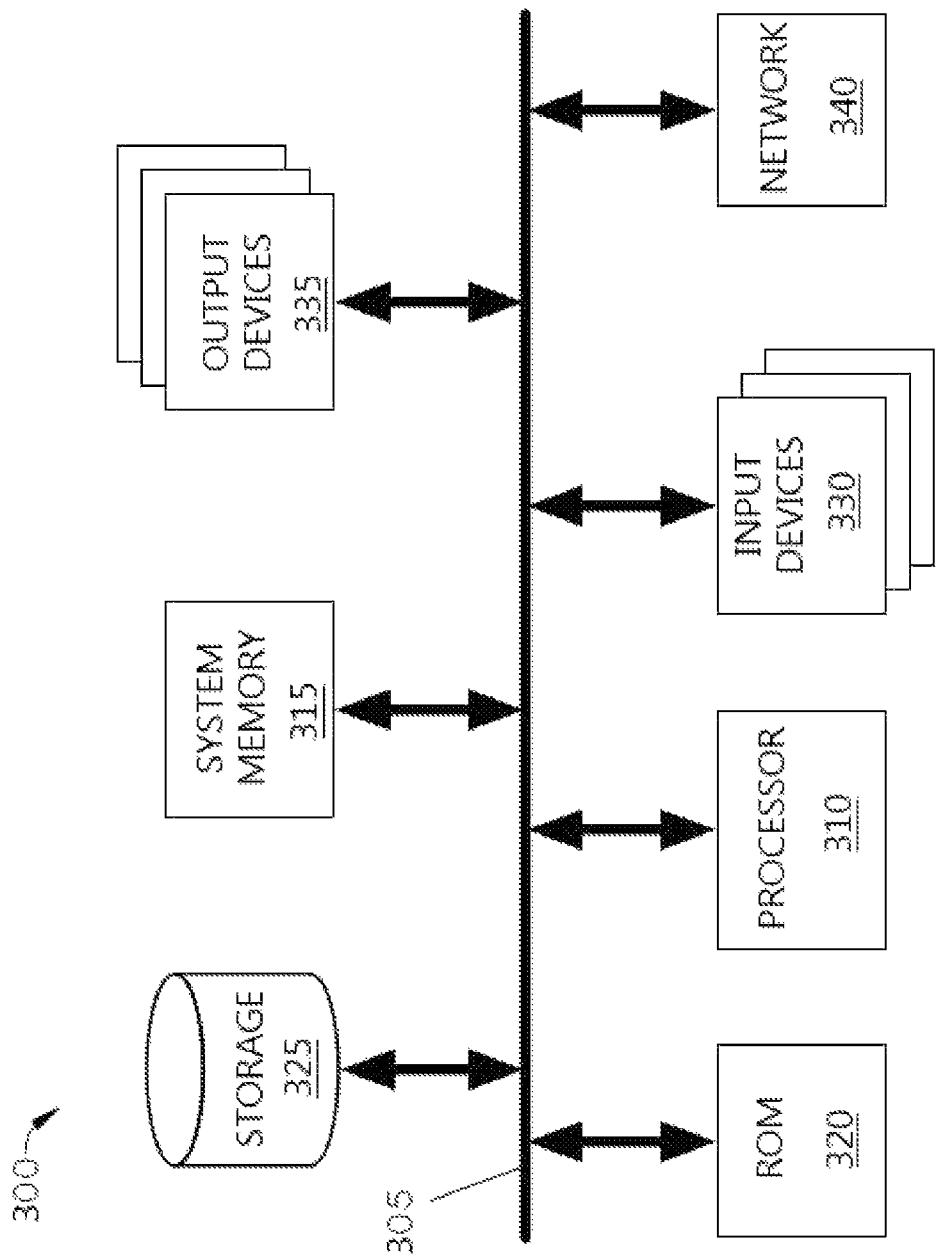
FIG. 3 conceptually illustrates an electronic system with which some embodiments of the invention are implemented.

FIG. 3 conceptually illustrates an electronic system 300 with which some embodiments of the invention are implemented. The electronic system 300 may be a computing device, such as a desktop computer, a laptop computer, a tablet computing device, a portable hand-held computing device, a portable communications devices (such as a mobile phone), a personal digital assistant (PDA) computing device, or any other sort of electronic device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only 320. For example, the various memory units include instructions for processing appearance alterations of displayable characters in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an Intranet), or a network of networks (such as the Internet). Any or all components of electronic system 300 may be used in conjunction with the invention.

The functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 2 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details and examples, but rather is to be defined by the appended claims.

We claim:

1. A non-transitory computer readable medium storing a program which when executed by at least one processing unit of a computing device provides a voice-activated unfolding of a story, the program comprising sets of instructions for:

displaying a set of words to be read by a person reading the story on a display attached to a microprocessor;

wherein the microprocessor is attached to a storage device; wherein the storage device houses the non-transitory computer readable medium;

receiving an audible input from the person reading the story from an audible input device communicatively coupled to the microprocessor; while the user is providing an audible input, executing the following loop of instructions:

determining whether the audible input represents a correct pronunciation of the displayed set of words with the microprocessor; while the user provides an incorrect pronunciation of the words on the display executing the following loop of instructions on the microprocessor until the user provides a correct pronunciation:

stopping the story on the display until the correct pronunciation of the displayed set of words is completed while displaying an icon indicating that the pronunciation of the set of words is incorrect;

engaging a teacher function that provides instruction on the correct pronunciation and the correct word order;

and displaying a set of images on the display representing a vignette of a passage of the story associated with the displayed set of words and continuing with the story by displaying a next set of words.

2. The non-transitory computer readable medium of claim 1, wherein the vignette is an animation and the set of images comprises a plurality of computer graphics imagery (CGI) images that are displayed in a sequence according to the animation.

3. The non-transitory computer readable medium of claim 1, wherein the vignette is a live action video clip and the set of images comprises a plurality of video frames that are displayed in a sequence according to the live action video clip.

4. The non-transitory computer readable medium of claim 1, wherein the story is a child-oriented story and the person reading the story is a child.

5. The non-transitory computer readable medium of claim 1, wherein the program further comprises a set of instructions for comparing the received audible input to a set of correctly pronounced template words corresponding to the displayed set of words.

6. The non-transitory computer readable medium of claim 5, wherein the audible input represents a vocalization of the displayed set of words, wherein the set of instructions for comparing comprises a set of instructions for transforming the received audible input into a set of wave forms, wherein each wave form represents a sound wave for a vocalization of a word in the displayed set of words.

7. The non-transitory computer readable medium of claim 6, wherein the set of instructions for determining comprises sets of instructions for:

computing, for each vocalization of a word, a difference between the wave form of the vocalization of the word and a wave form of the corresponding correctly pronounced template word; and comparing each computed difference to a threshold difference.

8. The non-transitory computer readable medium of claim 7, wherein the vocalization of the word is a correct pronunciation when the computed difference is within the threshold difference.

9. The non-transitory computer readable medium of claim 7, wherein the vocalization of the word is an incorrect pronunciation when the computed difference is not within the threshold difference.

10. The non-transitory computer readable medium of claim 9, wherein the program further comprises a set of instructions for launching a teacher mode to assist the reader of the story with correct pronunciation of the displayed set of words.

* * * * *